(12) United States Patent
Van Wiemeersch

(10) Patent No.: US 9,148,033 B2
(45) Date of Patent: Sep. 29, 2015

(54) SYSTEM OF SECURING A WIDE-RANGE OF DEVICES DURING WIRELESS CHARGING

(71) Applicant: FORD GLOBAL TECHNOLOGIES, LLC, Dearborn, MI (US)

(72) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 13/723,319

(22) Filed: Dec. 21, 2012

(65) Prior Publication Data

US 2014/0176057 A1  Jun. 26, 2014

(51) Int. Cl.
| | |
|---|---|
| *H02J 7/00* | (2006.01) |
| *H02J 3/46* | (2006.01) |
| *H02G 3/00* | (2006.01) |
| *H02P 9/00* | (2006.01) |
| *B65G 1/00* | (2006.01) |
| *B65G 65/00* | (2006.01) |
| *B60R 16/00* | (2006.01) |
| *B60K 1/04* | (2006.01) |
| *B61K 11/00* | (2006.01) |
| *H01F 21/02* | (2006.01) |
| *H01F 21/04* | (2006.01) |
| *H02J 7/02* | (2006.01) |

(Continued)

(52) U.S. Cl.
CPC ............... *H02J 7/025* (2013.01); *F16B 17/00* (2013.01); *H02J 7/0044* (2013.01); *B60K 1/04* (2013.01); *B60R 16/00* (2013.01); *B61K 11/00* (2013.01); *B65G 1/00* (2013.01); *H01F 21/02* (2013.01); *H01F 21/04* (2013.01); *H02G 3/00* (2013.01); *H02P 21/02* (2013.01); *Y10T 403/7062* (2015.01)

(58) Field of Classification Search
CPC ............... H02J 7/00; H02J 3/46; H02J 7/025; H02J 7/0044; H02G 3/00; H02P 9/00; B65G 1/00; B65G 65/00; B60R 16/00; B60K 1/04; B61K 11/00; H01F 21/02; H01F 21/04; F16B 17/00; Y01T 403/7062
USPC ............ 320/108, 115, 109; 310/50; 307/10.1, 307/153; 414/281, 282, 283; 180/68.5; 104/34; 336/45, 75, 121
See application file for complete search history.

(56) References Cited

U.S. PATENT DOCUMENTS

| | | |
|---|---|---|
| 3,938,018 A | 2/1976 | Dahl |
| 5,952,814 A | 9/1999 | Van Lerberghe |
| 6,075,340 A | 6/2000 | Koenck |

(Continued)

OTHER PUBLICATIONS

"Wireless Power Receiver IC Complements Existing Transmitter," Power Electronics Technology, www.powerelectronics.com, Jul. 2011, pp. 15-17.

(Continued)

*Primary Examiner* — Phallaka Kik
(74) *Attorney, Agent, or Firm* — Vichit Chea; Price Heneveld LLP

(57) ABSTRACT

A system for securing and wirelessly charging a chargeable device on a charger, particularly in a vehicle, is provided. The system includes at least one transmitting coil in proximity to a charging surface and an adjustable retaining assembly configured to substantially engage at least a portion of a perimeter of the chargeable device to position the chargeable device on the charging surface.

19 Claims, 11 Drawing Sheets

(51) Int. Cl.
*F16B 17/00* (2006.01)
*H02P 21/02* (2006.01)

(56) References Cited

U.S. PATENT DOCUMENTS

| | | | |
|---|---|---|---|
| 6,235,420 B1 * | 5/2001 | Ng | 429/96 |
| 6,419,379 B1 | 7/2002 | Hulse | |
| 7,434,954 B1 | 10/2008 | Newton et al. | |
| 7,518,337 B2 | 4/2009 | Beart et al. | |
| 7,633,263 B2 | 12/2009 | Toya | |
| 7,772,802 B2 | 8/2010 | Manico et al. | |
| 7,808,205 B2 | 10/2010 | Rao et al. | |
| 7,889,498 B2 | 2/2011 | Diebel et al. | |
| 7,932,638 B2 | 4/2011 | Randall | |
| 7,952,322 B2 | 5/2011 | Partovi et al. | |
| 8,102,147 B2 | 1/2012 | Jung | |
| 8,103,266 B2 | 1/2012 | Fok et al. | |
| 8,120,311 B2 | 2/2012 | Baarman et al. | |
| 8,169,185 B2 | 5/2012 | Partovi et al. | |
| 8,242,741 B2 | 8/2012 | Phelps, III | |
| 8,373,310 B2 | 2/2013 | Baarman et al. | |
| 8,410,751 B2 | 4/2013 | Terao et al. | |
| 8,421,278 B2 | 4/2013 | Yamamoto et al. | |
| 8,903,456 B2 | 12/2014 | Chu et al. | |
| 9,059,591 B2 * | 6/2015 | Niec et al. | 1/1 |
| 2003/0036805 A1 * | 2/2003 | Senior | 623/65 |
| 2005/0127867 A1 | 6/2005 | Calhoon et al. | |
| 2005/0131486 A1 | 6/2005 | Boveja et al. | |
| 2007/0293277 A1 | 12/2007 | Bury | |
| 2009/0051312 A1 | 2/2009 | Simon et al. | |
| 2009/0146608 A1 | 6/2009 | Lee | |
| 2010/0114241 A1 | 5/2010 | Donofrio et al. | |
| 2010/0181961 A1 | 7/2010 | Novak et al. | |
| 2010/0207575 A1 | 8/2010 | Pijnenburg et al. | |
| 2010/0253281 A1 | 10/2010 | Li | |
| 2010/0289448 A1 | 11/2010 | Jung et al. | |
| 2011/0018679 A1 | 1/2011 | Davis et al. | |
| 2011/0050164 A1 | 3/2011 | Partovi et al. | |
| 2011/0291613 A1 | 12/2011 | Rosik et al. | |
| 2012/0104997 A1 | 5/2012 | Carobolante | |
| 2012/0117730 A1 * | 5/2012 | Lemire et al. | 5/611 |
| 2012/0206098 A1 | 8/2012 | Kim | |
| 2012/0235636 A1 | 9/2012 | Partovi | |
| 2012/0299538 A1 | 11/2012 | Arai et al. | |
| 2013/0020988 A1 | 1/2013 | Kim et al. | |
| 2013/0049682 A1 * | 2/2013 | Niec et al. | 320/108 |
| 2013/0076308 A1 | 3/2013 | Niskala et al. | |
| 2013/0093390 A1 | 4/2013 | Partovi | |
| 2013/0096651 A1 | 4/2013 | Ozawa et al. | |
| 2013/0113421 A1 | 5/2013 | Han et al. | |
| 2013/0147426 A1 * | 6/2013 | Misono | 320/108 |
| 2013/0257363 A1 | 10/2013 | Lota et al. | |
| 2013/0300204 A1 | 11/2013 | Partovi | |
| 2014/0103865 A1 | 4/2014 | Van Wiemeersch et al. | |
| 2014/0125277 A1 | 5/2014 | Van Wiemeersch et al. | |
| 2014/0129054 A1 | 5/2014 | Huntzicker et al. | |
| 2014/0191568 A1 | 7/2014 | Partovi | |
| 2014/0203770 A1 | 7/2014 | Salter et al. | |
| 2014/0217965 A1 | 8/2014 | Van Wiemeersch et al. | |
| 2014/0239891 A1 | 8/2014 | Martin et al. | |

OTHER PUBLICATIONS

"Qi Compliant Wireless Power Transmitter Manager," Texas Instruments Incorporated, www.ti.com, document bq500210, Jun. 2011, Revised Aug. 2011, 25 pages.

Ngo, Dong, "CES: Universal Wireless Charging ElectroHub to Demo at CES 2011," www.cnet.com/8301-32254_1-20024327-283.html, Dec. 1, 2010, 7 pages.

* cited by examiner

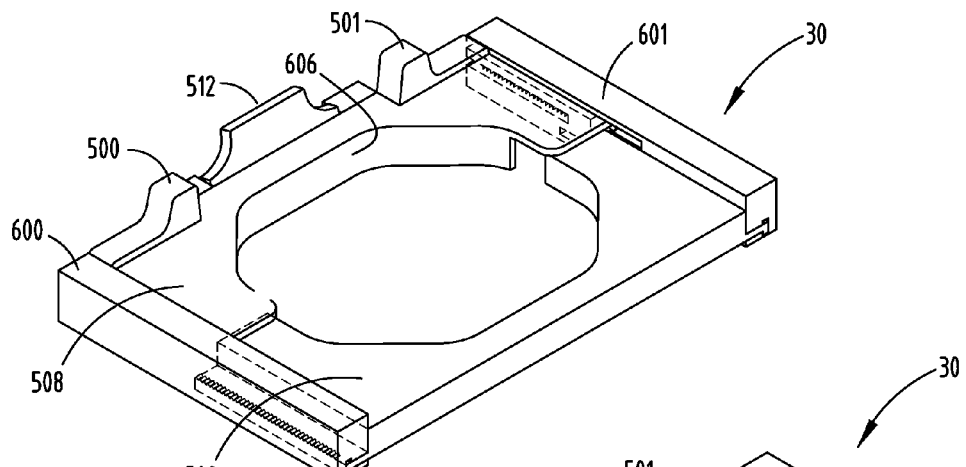
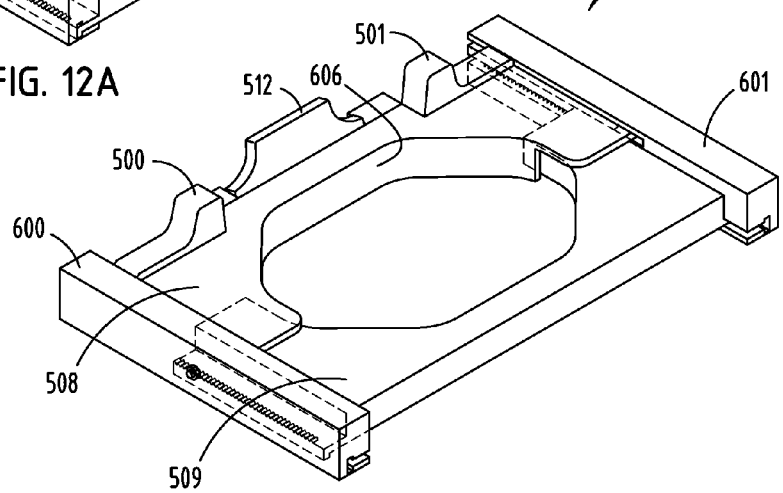
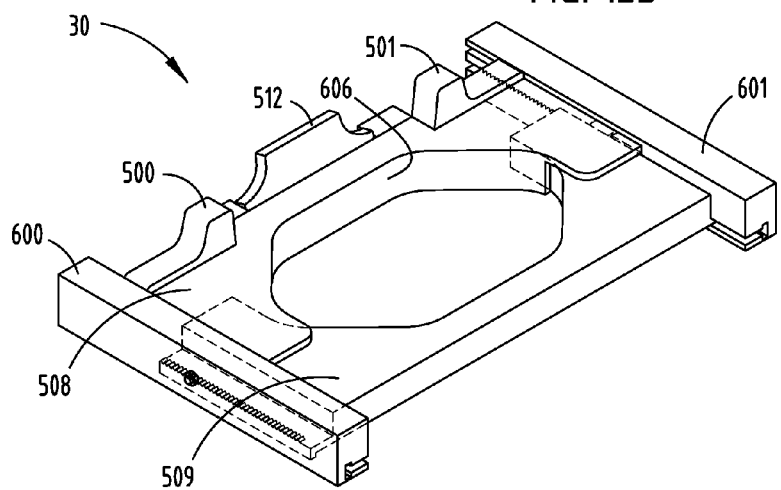

SYSTEM OF SECURING A WIDE-RANGE OF DEVICES DURING WIRELESS CHARGING

FIELD OF THE INVENTION

The present invention generally relates to wireless charging systems, and more particularly relates to securing a wide-range of devices during wireless charging in a vehicle.

BACKGROUND OF THE INVENTION

Portable battery operated electronic devices, such as cell phones, employ rechargeable batteries that must be recharged when battery charge is consumed. Typically, electric powered or electronic devices are physically connected to an electrical charger via a wire connection. More recently, wireless charging devices such as inductive chargers are available to charge the battery without any physical wire connection between the electronic device and the charging device. Wireless chargers generate an electromagnetic field through the use of electromagnetic transducers to transfer the electric energy from the charging device to a receiver on a battery or device managing battery charging.

Inductive chargers generate a magnetic field through the use of inductive coils to transfer the electric energy from the charging device to a receiver on a battery or device-managing battery charging. Inductive chargers have been proposed for use in various locations within the cockpit of a vehicle for charging a portable battery or a battery operated device. Typically, the charger is near the driver and passengers, for the sake of convenience to allow easy access to the devices. Generally, efficiency of wireless charging of electronic devices on the wireless charger depends on proper alignment of a device with the charger. However, devices may become substantially misaligned due to wireless charging in a non-static environment such as a moving vehicle. Such misalignment during charging may result in inefficiency of charging that leads to excessive heating posing potential damage to the battery of the device and/or the device being charged. Additionally, the battery charging control circuit in most consumer electronic devices will disallow charging when the battery gets too warm and the device will stop working until it cools. It is therefore desirable to provide a flexible and universal system in a manner that properly secures alignment of the device for wireless charging, thereby minimizing inefficiently of charging and damage to the battery of the device and/or the device being charged due to the misalignment.

SUMMARY OF THE INVENTION

According to one aspect of the present invention, a system for wirelessly charging a chargeable device is provided. The system includes a charger having at least one transmitting coil in proximity to a charging surface. The system also includes an adjustable retaining assembly configured to substantially engage at least a portion of a perimeter of the chargeable device to position the chargeable device on the charging surface.

According to another aspect of the present invention, an in-vehicle system for wirelessly charging a chargeable device is provided. The in-vehicle system includes a charger having at least one transmitting coil in proximity to a charging surface. The in-vehicle system also includes an adjustable retaining assembly configured to substantially engage at least a portion of a perimeter of the chargeable device to position the chargeable device on the charging surface so that a receiving coil of the chargeable device maintains a particular orientation on the charging surface.

According to a further aspect of the present invention, a retainer assembly is provided. The retainer assembly includes a first retaining member and a second retaining member configured to substantially engage at least a portion of a perimeter of a chargeable device to position the chargeable device on a surface in proximity to at least one retaining member. The retainer assembly also includes an adjustable mechanism configured to allow the first retaining member to move relative to the second retaining member to position the device.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 12A is an example of the adjustment of retaining members 508 and 509 for retaining the corners of a large size device in order to maintain alignment between a device and the charging apparatus;

FIG. 12B is an example of the adjustment of retaining members 508 and 509 for retaining the corners of a medium size device in order to maintain alignment between a device and the charging apparatus;

FIG. 12C is an example of the adjustment of retaining members 508 and 509 for retaining the corners of a small size device in order to maintain alignment between a device and the charging apparatus;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
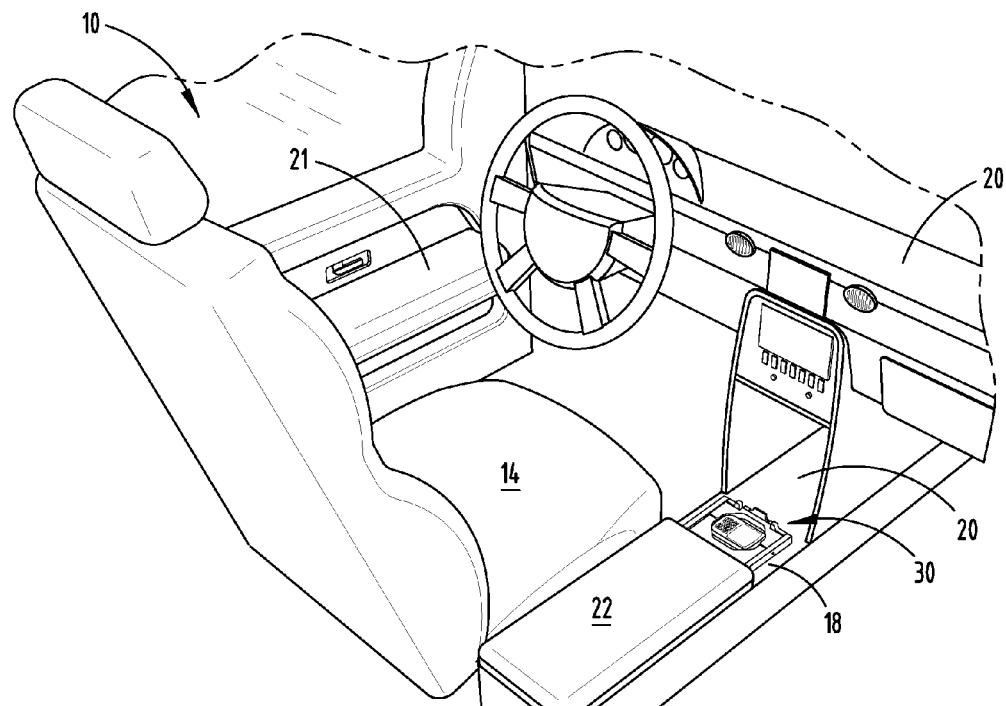
FIG. 1 is a perspective view of a cockpit of a vehicle employing a wireless charger at a potential charging region in a center console tray, according to one embodiment.
Figure 2:
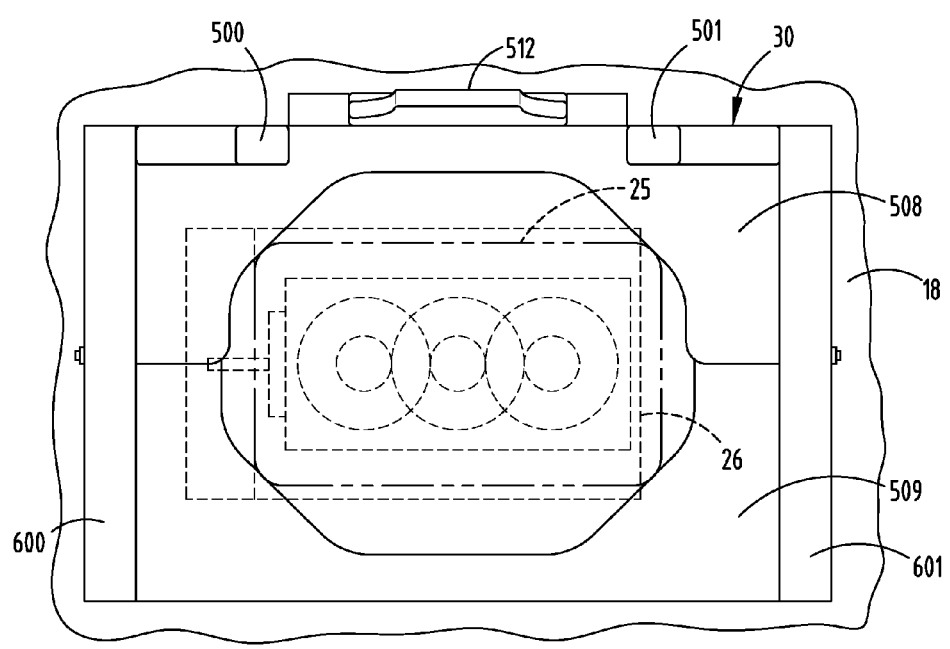
FIG. 2 is an enlarged top view of the tray further illustrating the charging region with a portable chargeable device in proximity to the charger.

Referring to FIGS. 1 and 2, the interior of an automotive vehicle 10 is generally illustrated having a compartment employing a wireless charging system 30, according to one embodiment. The vehicle 10 generally includes a seating arrangement including a front driver seat 14 adapted to seat a person as an occupant in the compartment of the vehicle 10. The vehicle 10 also includes a center console 18 with storage compartment 22 disposed between front seat 14 and another passenger front seat (not shown), and side door armrests 21. The center console 18, center stack and dashboard 20, and armrests 21, as well as other vehicle assemblies, may be equipped with various device holders such as trays and storage compartments that may receive one or more devices for wireless charging. The vehicle 10 may further include rear seating and wireless charging trays and storage compartments configured for wireless charging located in the rear seating area.

FIG. 2 illustrates an enlarged view of a portion of the center console and charging tray containing a wireless charging system 30. In the embodiment shown, a charging region 24 may be located on the center console 18 of the vehicle 10 and a portable chargeable device 25 may be placed on the surface of the charging system 30. The vehicle 10 may be equipped with one or more wireless charging systems 30 for wirelessly charging one or more devices, including one or more rechargeable batteries providing electrical power within an electronic device. In the embodiment shown and described herein, the wireless charging system is an inductive charging system. It should be appreciated that other forms of wireless transmission may be employed in the wireless charging system such as magnetic resonance (loose coupled resonance) and electromagnetic radiation according to other embodiments. In one embodiment, one or more wireless charging systems 30 may be provided in one or more storage trays or dedicated trays provided in center console 18 or other areas in the vehicle cockpit. The wireless charging system 30 includes a wireless charger 26, such as an inductive charger according to one embodiment. Inductive chargers typically include one or more coils for generating electric signals in the form of an electromagnetic field (EMF) typically at low frequencies (sub 500 kHz) within a charging region 24. In the embodiment shown, the charging region 24 may be defined by a tray or a storage compartment having a bottom wall and side walls for receiving a device, such that the device when located within the charging region 24 may be charged via the electromagnetic field through inductive coupling. According to another embodiment, the wireless charging system 30 may use a charging region 24 provided on one or more pads or trays provided in the vehicle dashboard 20. According to a further embodiment, the wireless charging system 30 may use a charging region 24 provided with a wireless charger 26 located in a tray within the armrest 21 extending from a vehicle door. In each of these embodiments, the wireless charging system 30 has a charging region 24 adapted to receive one or more devices, such as rechargeable batteries or electric powered or electronic devices 25 employing rechargeable batteries that may be charged via an electric signal on the charging region and may be accessible to the driver or other passengers within the cockpit 12 of vehicle 10. Examples of electronic devices 25 that may be charged by the charging system 30 include cell phones, tablets, cameras, Bluetooth ear pieces, portable radios, lighting devices, and music and video players.

The wireless charging system 30 also includes an adjustable retaining assembly formed by jaws 508 and 509 configured to substantially engage at least a portion of the perimeter of the rechargeable device to position the chargeable device in a charging region in the tray. The adjustable retaining assembly jaws 508 and 509 adjust to the size of the device and positions the device on the centerline of the inductive charger coil(s).

Figure 3:
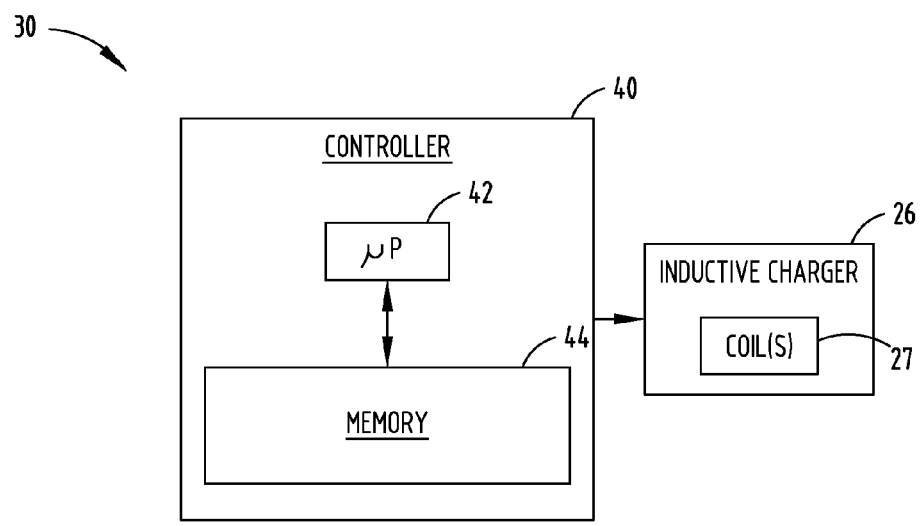
FIG. 3 is a block diagram of the wireless charging system, according to one embodiment.

Referring to FIG. 3, the wireless charging system 30 is further illustrated having control circuitry shown in one embodiment as a controller 40 including a microprocessor 42 and memory 44. The controller 40 may include other or additional analog and/or digital circuitry. Controller 40 may process input information from memory and generate an output to the inductive charger 26 having inductive coil(s) 27 so as to wirelessly transfer electrical energy for the purposes of charging one or more rechargeable batteries provided in device 25.

Figure 4:
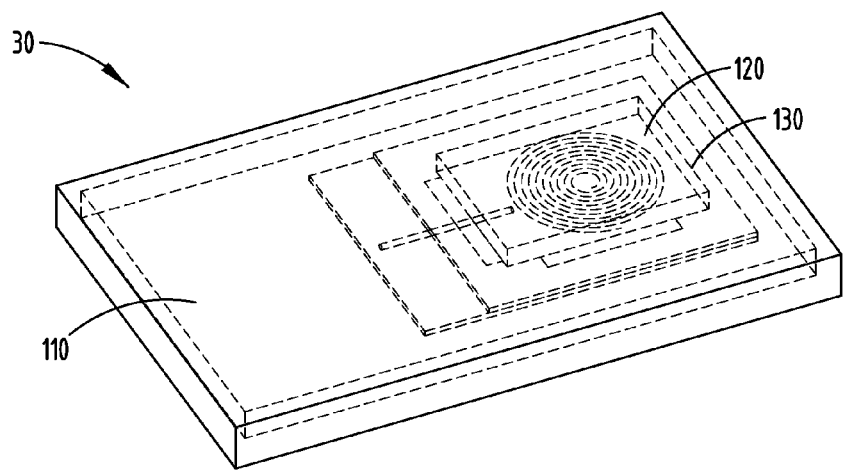
FIG. 4 is a perspective view of the wireless charging system of a receiver device, according to one embodiment.

FIG. 4 illustrates one implementation of the charging components of the receiver device on a wireless charging system 30 in relation to the device receiver coil according to one embodiment. In FIG. 4, a transmitter section 110 may be housed in charging system 30. The transmitter section 110 may contain one or more transmitter coils (not shown) which may be coupled to a connector that is plugged into a standard external power source. A receiver 130 may be housed in chargeable electronic device 25. The transmitter section 110 may provide power to the receiver 130 such that the receiver 130 provides power to a rechargeable battery and the transmitter section 110 may receive additional control information from receiver 130 to adapt to a particular power transfer based on the control information.

The vehicle charging system 30 may include one or more wireless chargers for generating electric charging signals in a charger region 24 to charge electronic device 25 containing a rechargeable battery. The wireless charger may include a charger 26 generating an electromagnetic field. The charger may include one or more inductive coils 27 located below or on the bottom surface of the charger region 24 such as a pad for generating an electromagnetic field in the charger region 24. The electromagnetic field passes from inductive coils 27 into the charger region 24 and is intended to wirelessly couple to one or more inductive receiver coils 120 provided in the portable electronic device 25 so as to transfer electrical energy thereto for purposes of charging one or more rechargeable batteries. As a result, an electromagnetic field is present within the charger region 24.

Figure 5:
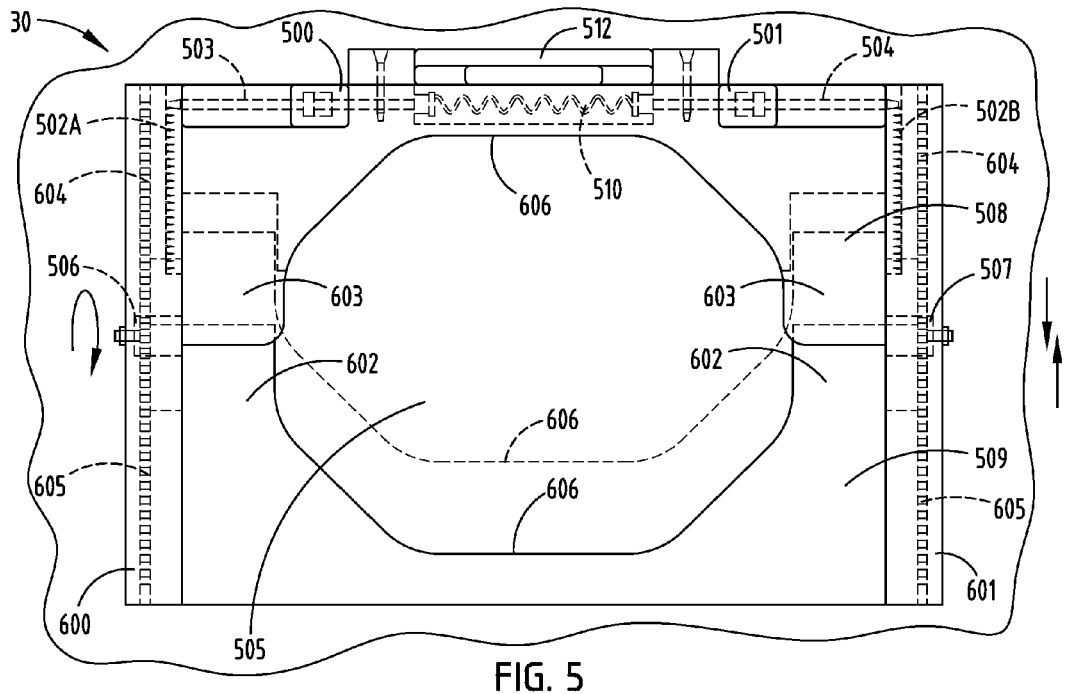
FIG. 5 is a view of the adjustable retaining assembly of the charging system showing the retaining members engaged within the housing cavities of the side rails according to one embodiment.

Referring to FIG. 5, one embodiment of the charging system shown in FIG. 2 and the adjustable retaining assembly are shown. The inside of the adjustable retaining assembly is shown having releasable pins 503 and 504, teeth or hole patterns 502A and 502B, driving gears 506 and 507, a left side rail 600 engaged with a first and second teeth pattern 604 and 605 of a first and second retaining member 508 and 509, and on a right side rail 601 engaged with a first and second teeth pattern 604 and 605 of a first and second retaining member 508 and 509. It is understood that the housing 30 can have any suitable shape and/or dimensions and may include any suitable number of generally defined locations.

In the embodiment shown, housing 30 may include an inductive charging coil or coil array just below surface area 505 (not shown) supporting the top and bottom retaining members 508 and 509 and side rails 600 and 601 (i.e. an adjustable retaining portion). The charging coil housing (not shown) containing one or more charging coils mounted under surface area 505 is for inductively charging device 25. The charging coil housing of surface 505 may remain stationary while a user adjusts the position of the top and bottom retaining members 508 and 509 of the adjustable retaining assembly in order to hold at least a portion of the perimeter of the chargeable device 25 onto the interior members.

Retaining the chargeable device 25 at its corners for charging rather than its sides ensures that the interior surface 606 of members 508 and 509 does not press on buttons/switches that may exist on the sides of most devices. Engaging the device 25 at its four corners enables proper alignment for optimal inductive charging of the device 25 without the risk of pressing on buttons/switches or other inputs of the device during alignment of the device for charging.

Figure 6:
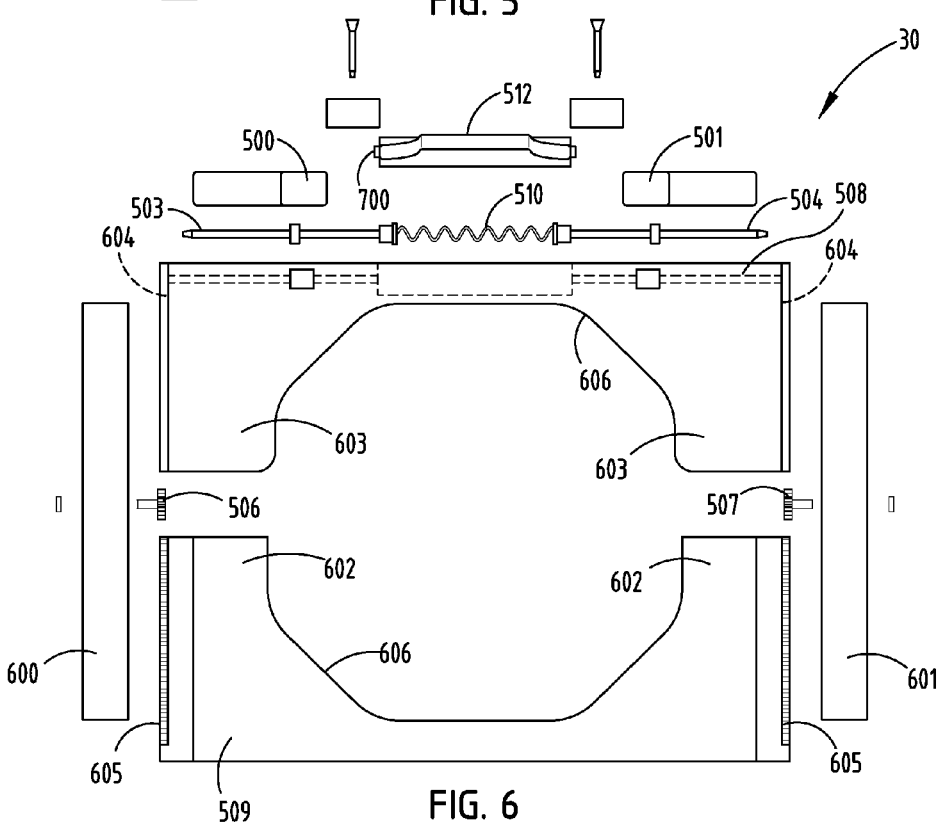
FIG. 6 is an exploded view of the adjustable retaining assembly of the charging system, illustrating top and bottom retaining members, side rails, a cam lock pivot, releasable pins and driving gears therein.
Figure 7:
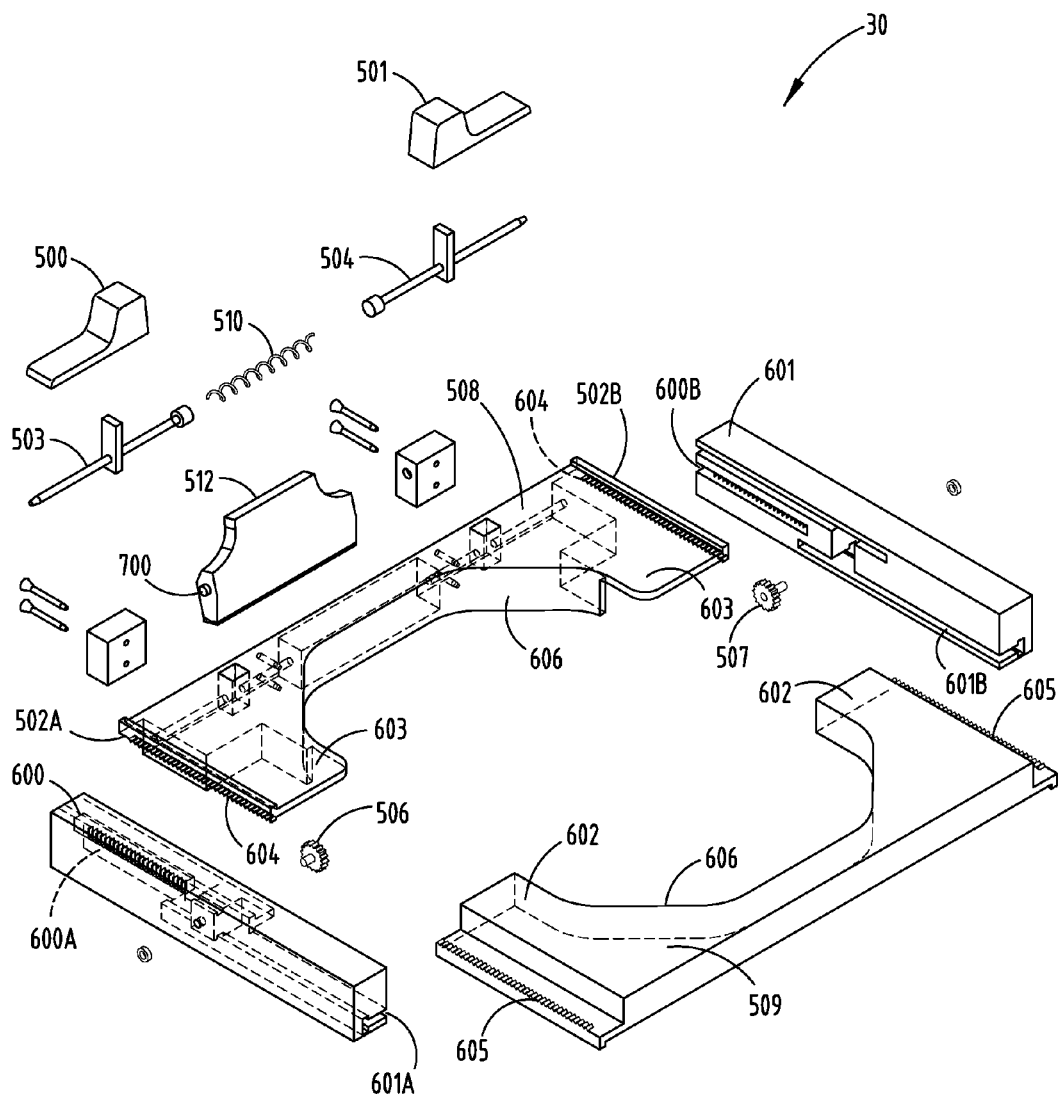
FIG. 7 is an exploded view of the adjustable retaining assembly of the charging system, illustrating top and bottom retaining members, side rails, a cam lock pivot, releasable pins and driving gears therein.

FIGS. 6 and 7 further depict the housing and adjustable retaining assembly of the charging system, illustrating each retaining member 508 and 509 including a top portion having a pair of wing shaped tabs 603 and 602. It is understood that the shape of the retaining members 508 and 509 can be any suitable shape. Retaining member 508 contains a pair of teeth patterns 604 that engage and are movable within housing cavities 600A and 600B of side rails 600 and 601. Similarly, retaining member 509 contains a pair of teeth patterns 605 that engage and are movable within housing cavities 601A and 601B of side rails 600 and 601. Additionally, a first gear 506 is mounted within side rail 600 and a second gear 507 is mounted within side rail 601 such that each gear is engaged between the teeth patterns 604 and 605 which are engaged within the four housing cavities. The engagement between teeth patterns 604 and 605 and cavities within side rails 600 and 601 and the engagement between gears 506 and 507 and teeth patterns 604 and 605 form a movable wedge between blocks 602 and 603 on the edges of the retaining members 509 and 508 respectively. Provided pins 503 and 504 are in the unlocked position and cam 512 is not locked, the user may move retaining members 508 and 509 by placing their finger or hands on one of the members and moving their finger or hands in the direction (i.e. either up or down) that the user wishes the members to move. As retaining member 508 is slid by a user, gears 506 and 507, which are mounted to the side rails 600 and 601 rotate. Teeth 604 on the sides of member 508 ride over the rotating gear while guided by slot cavities 600A and 600B. In synchronized motion with the movement of teeth 604, teeth 605 ride under gears 506 and 507 guided by slot cavities 601A and 601B. Therefore, if retaining member 508 is adjusted up by the user, retaining member 509, also driven by both gears 506 and 507, is simultaneously adjusted down by an equal amount. As a result, the retaining members 508 and 509 move towards or away from each other.

The housing 30 and the adjustable retaining assembly 508 and 509 can maintain alignment of the receiving coils of device 25 so that charging of the coils by transmitter coil housing on surface area 505 is optimized. This optimization may be achieved by a user manually adjusting the retaining members 508 and 509 as explained above. The user may adjust the retaining members to properly position the device to minimize misalignment by situating the device such that the interior surface of members 508 and 509 tangentially engage all four corners of device 25 at approximately a forty-five degree angle. The inside surfaces 606 of retaining members 508 and 509 may be made of any suitable rubberized compressible material in order to maintain traction between the inside surfaces 606 and the corners of device 25 engaged on the surfaces. It is understood that there may other suitable ways of retaining the corners of device 25 for wireless charging such as providing corner support cushions/bumpers positioned in proximity or on the interior surface of retaining members 508 and 509 and/or including notches/cutouts in proximity or on the interior surface of retaining members 508 and 509 in order to aptly engage certain kinds of input that may exist on device 25.

In addition, housing 30 may include a cam lock pivot 512 for firmly locking the device in place once properly aligned within the charging apparatus. The cam lock pivot 512 may be screwed in place onto housing 30 by two sets of screws 513 as illustrated in FIG. 7. The feature of firmly locking the device with the cam lock pivot will be explained in further detail with regards to FIGS. 11A-11H below.

Figure 8:
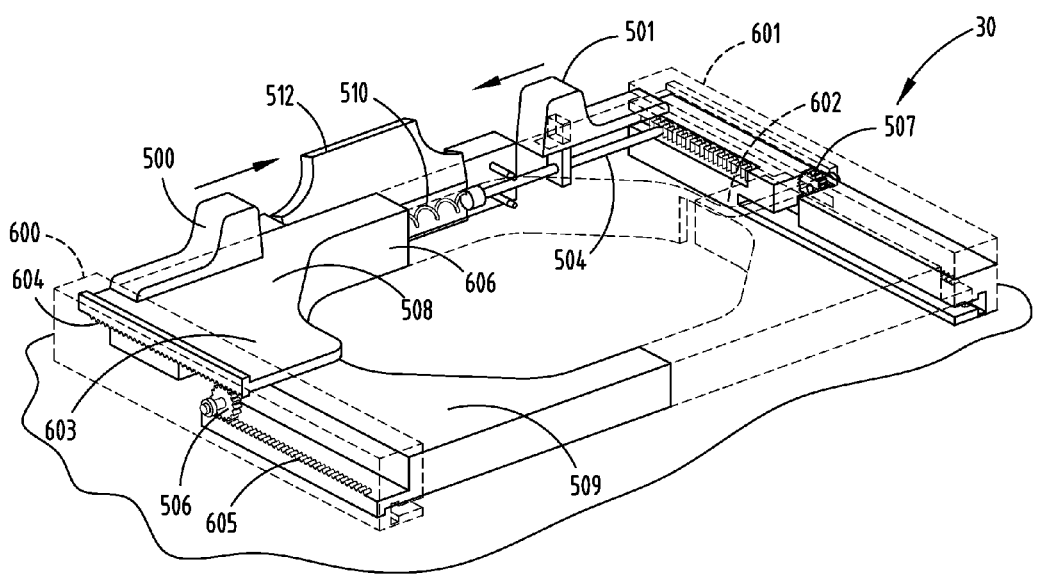
FIG. 8 is a perspective view of an embodiment of the adjustable retaining assembly illustrating movement of user adjustable tabs causing release of pins from teeth or holes located within the side rails of the housing.
Figure 9:
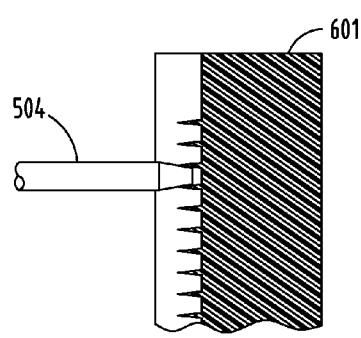
FIG. 9 is an enlarged view of one of the pins engaged with teeth or holes located within the side rails of the housing.
Figure 9A:
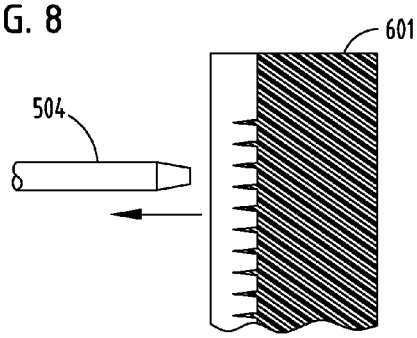
FIG. 9A is an enlarged view of the pin released from the teeth or holes.
Figure 9B:
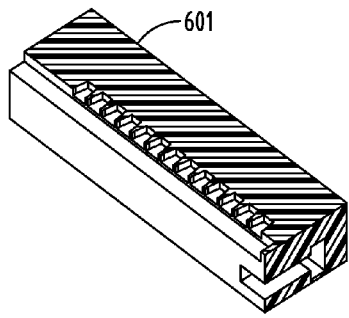
FIG. 9B is an enlarged view of the pin engaged to the teeth.
Figure 9C:
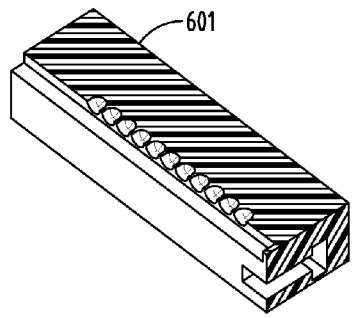
FIG. 9C is an enlarged view of the pin engaged to a hole.

In order to adjust up or down the position of first and second retaining members 508 and 509 to retain the corners of device 25 and thus, maintain alignment between device 25 and surface area 505, a user may first need to unlock the adjustable retaining assembly as depicted in FIG. 8. The unlocking function may be achieved by the user placing their thumb and index finger on tabs 500 and 501 and squeezing the tabs 500 and 501 to move the tabs toward the center pivot 512. As shown in FIGS. 9 and 9A, the squeezing motion causes compression of spring 510 thereby releasing pins 503 and 504, which are adjacent to and in contact with spring 510, from engagement on tooth or hole patterns 502A and 502B within side rails 600 and 601. Such a release allows the user to freely slide retaining members 508 and 509 along the interior cavities of side rails 600 and 601 since pins 500 and 501 are no longer obstructing movement of the retaining members.

Figure 10:
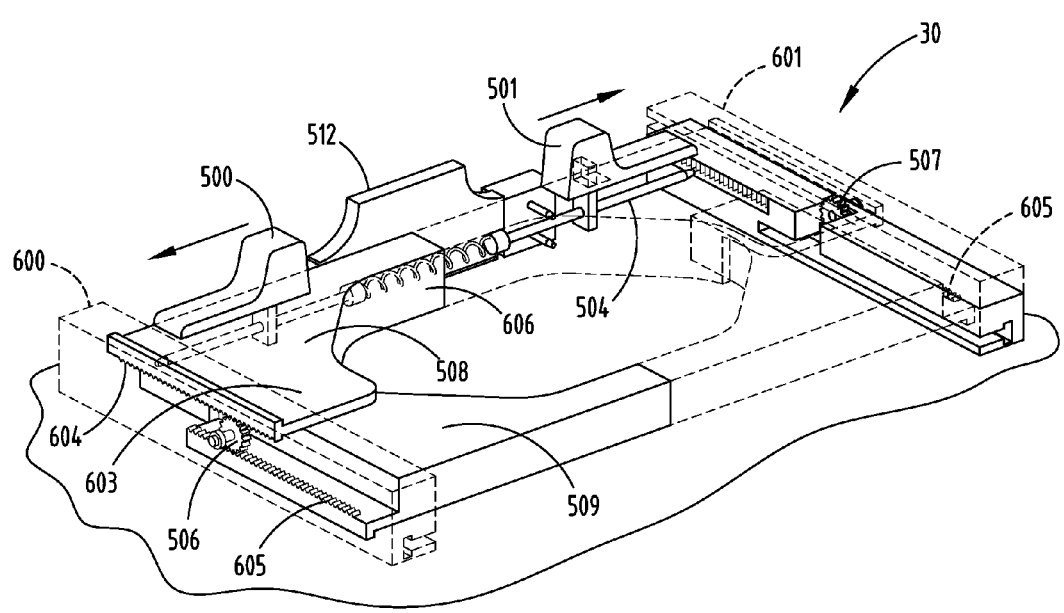
FIG. 10 is a perspective view of an embodiment of the adjustable retaining assembly, illustrating movement of user adjustable tabs causing soft locking whereby pins are engaged to the teeth or holes located within the side rails of the housing.

Once a user has determined that the members have been properly adjusted to tangentially retain the four corners of device 25 at an approximate forty-five degree angle, the user may move the tabs away from the cam pivot causing soft locking whereby pins are engaged to the teeth or holes located within the side rails of the housing as shown in FIG. 10. Such soft locking of housing 30 may be achieved when the user removes squeezing their thumb and index finger on tabs 500 and 501 as shown in FIG. 10. When the user removes force applied by their thumb and index finger, it will cause spring 510 to move back into an uncompressed state. Such uncompressing of the spring will cause pins 503 and 504, adjacent to and in contact with spring 510, to be pushed back into engagement within tooth or hole patterns 502A and 502B. The engagement between pins 503 and 504 and tooth or hole patterns 502A and 502B provide the soft locking of retaining members as mobility of the retaining members is hindered and limited by the engagement.

Figure 11A:
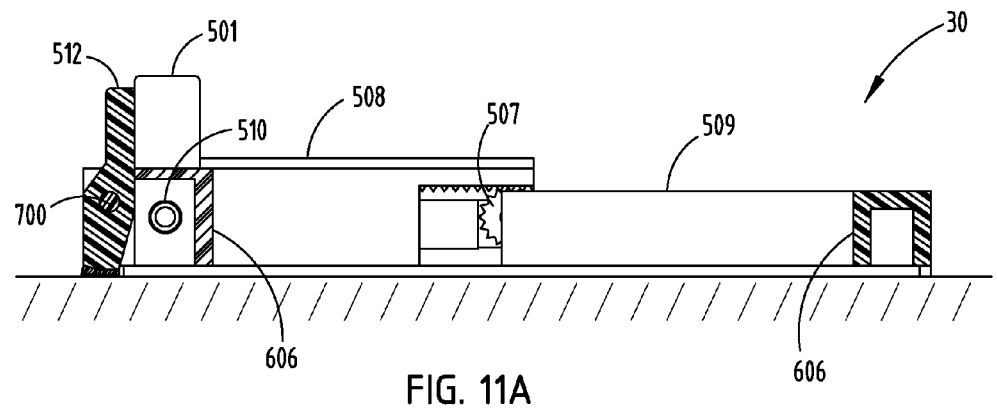
FIG. 11A is a side view of an embodiment of the charging apparatus showing a cam lock in an unlocked position in accordance with one embodiment.
Figure 11B:
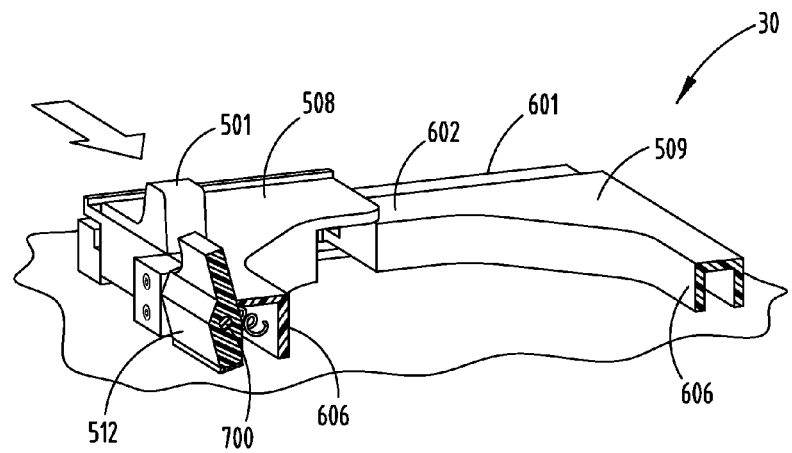
FIG. 11B is a perspective view of an embodiment of the charging apparatus showing a cam lock in a locked position.
Figure 11C:
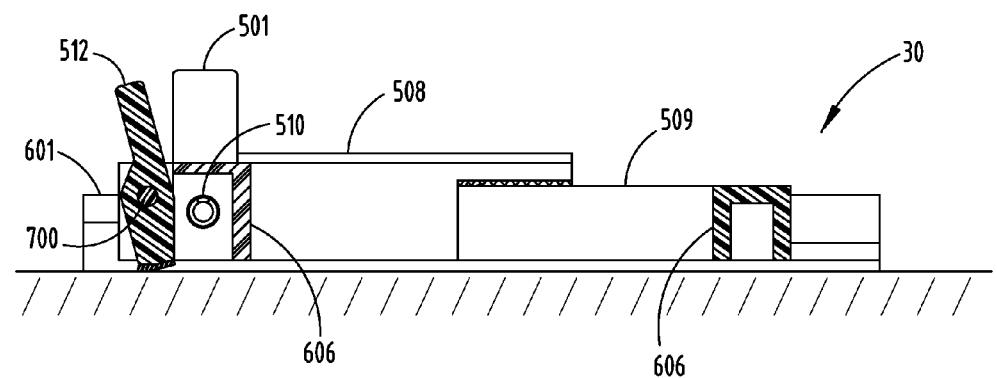
FIG. 11C is a side view of an embodiment of the charging apparatus showing a cam lock in a locked position.

FIGS. 11A-11H depict side and perspective views of the cam pivot and operating the pivot for firmly locking the alignment of the device in place within the charging apparatus. FIG. 11A illustrates a side view of the charging apparatus 30 showing a cam lock 512 in an unlocked position in accordance with one embodiment. As noted above with reference to FIG. 7, the cam lock 512 may be secured by two blocks screwed in place onto housing 30 by two sets of screws. FIG. 11B illustrates a perspective view of the charging apparatus 30 showing a cam lock 512 in a locked position. FIG. 11C illustrates a side view of the charging apparatus 30 showing a cam lock 512 in the locked position. As shown in FIGS. 11A-11C, the cam pivot may be adjusted from either locked to unlocked position or unlocked to locked position through an axis of rotation along the pivot point 700.

Figure 11D:
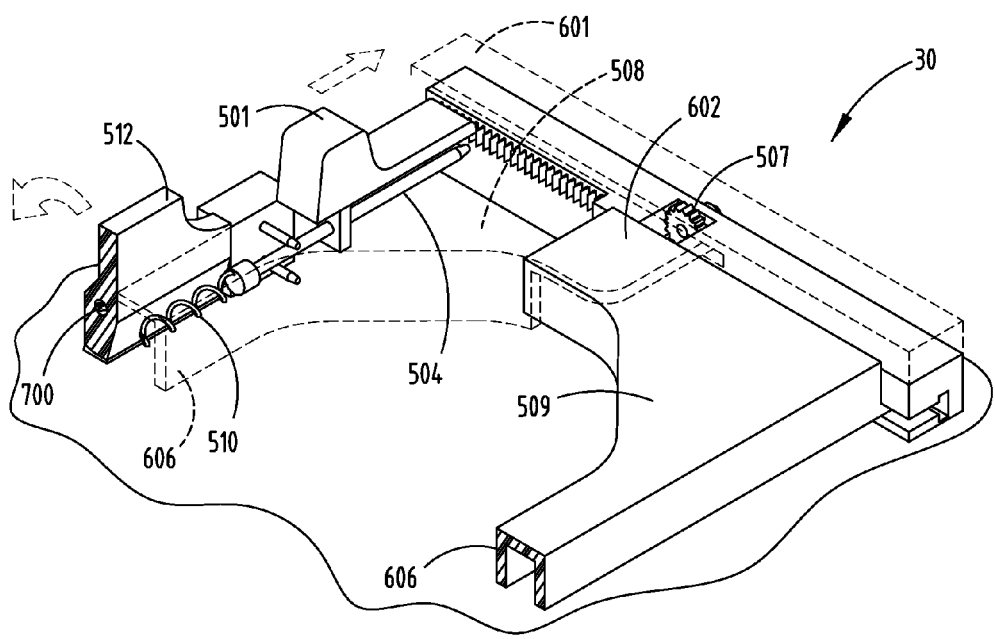
FIG. 11D is a perspective view of an embodiment of the charging apparatus showing a cam lock and pin placed in an unlocked position.
Figure 11E:
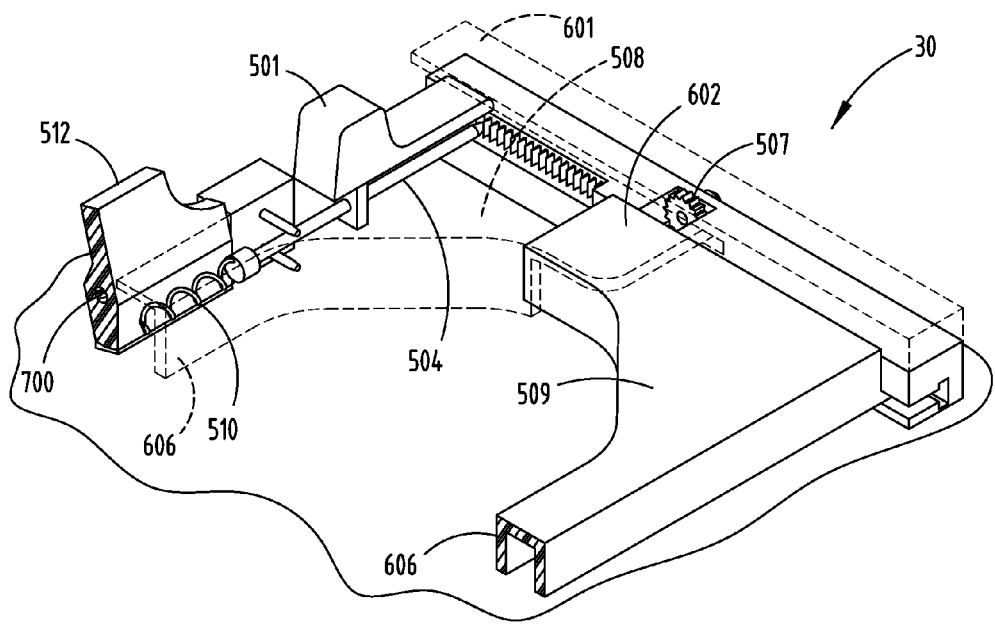
FIG. 11E is a perspective view of an embodiment of the charging apparatus showing a cam lock and pin placed in a locked position.

A process of firmly locking the device in place is illustrated in FIGS. 11D and 11E. Once the user has released tabs 500 and 501 and spring 510 moves the tabs away from the cam pivot causing soft locking, the pins are engaged to the teeth or holes located within the side rails of the housing (shown in FIG. 10), after which the user may then rotate cam pivot 512 along its axis of rotation through pivot point 700 counter-clockwise (shown in FIG. 11D) resulting in the cam pivot causing greater friction between a rubberized portion under cam 512 and the charging surface 505. This increased friction between the bottom of the cam pivot and the rubberized 505 surface prevents jaw member 508 from moving easily and this same force from the cam wedge 512 also causes a tighter fit between the teeth 502A and 502B on jaw 508 placing force down on the gears resulting in firmly locking the alignment of the device in place within the charging apparatus.

Figure 11F:
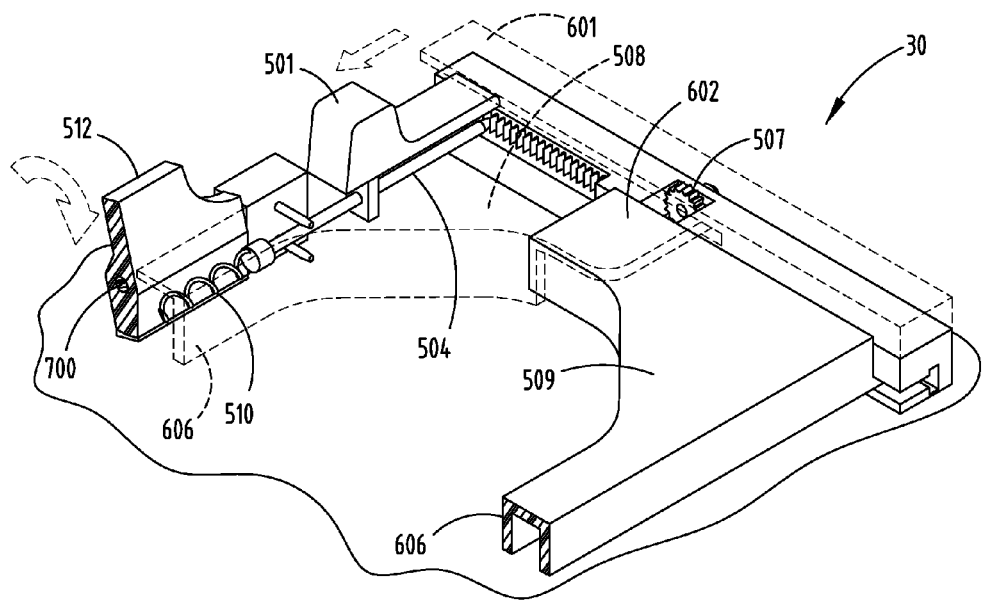
FIG. 11F is a perspective view of an embodiment of the charging apparatus showing a cam lock and pin placed in a locked position.
Figure 11G:
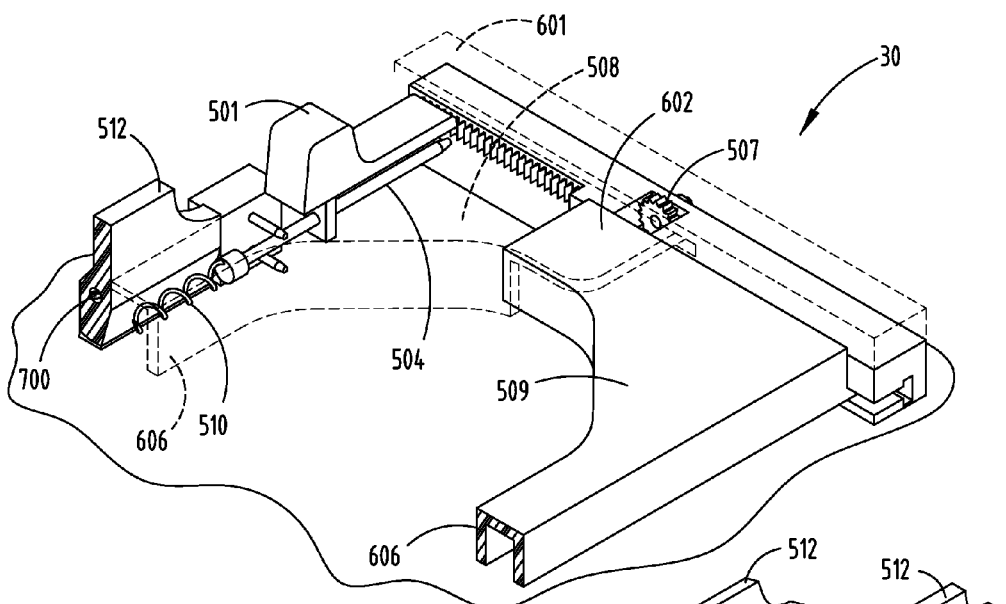
FIG. 11G is a perspective view of an embodiment of the charging apparatus showing a cam lock and pin placed in an unlocked position.

The process of unlocking the device in place in order to adjust the charging pad to properly retain the corners of the device is shown in FIGS. 11F and 11G. To unlock the device from a locked position, the user may rotate cam pivot 512 along its axis of rotation though pivot point 700 clockwise from the firm locked position shown in FIG. 11D resulting in cam pivot lessening its friction onto the rubberized charging surface and gears.

Figure 11H:
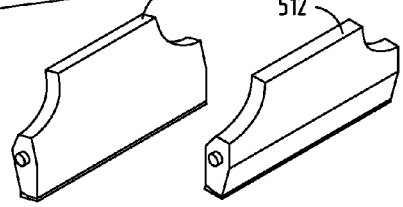
FIG. 11H is expanded detail of the cam lock wedge.

A perspective view of the cam pivot illustrating locked and unlocked positions is shown in FIG. 11H. As noted above, the user may rotate the pivot along its pivot point 700 to adjust the pivot from one position to the other.

Examples of the adjustment of retaining members 508 and 509 for retaining the corners of different size devices in order to maintain alignment between a device and charging apparatus are shown in FIGS. 12A-12C. For example, the user may adjust the retaining members to move from retaining the corners of a larger size device as shown in FIG. 12A to a medium sized or smaller sized device as shown in FIGS. 12B and 12C.

Figures 13A, 13B, 13C:
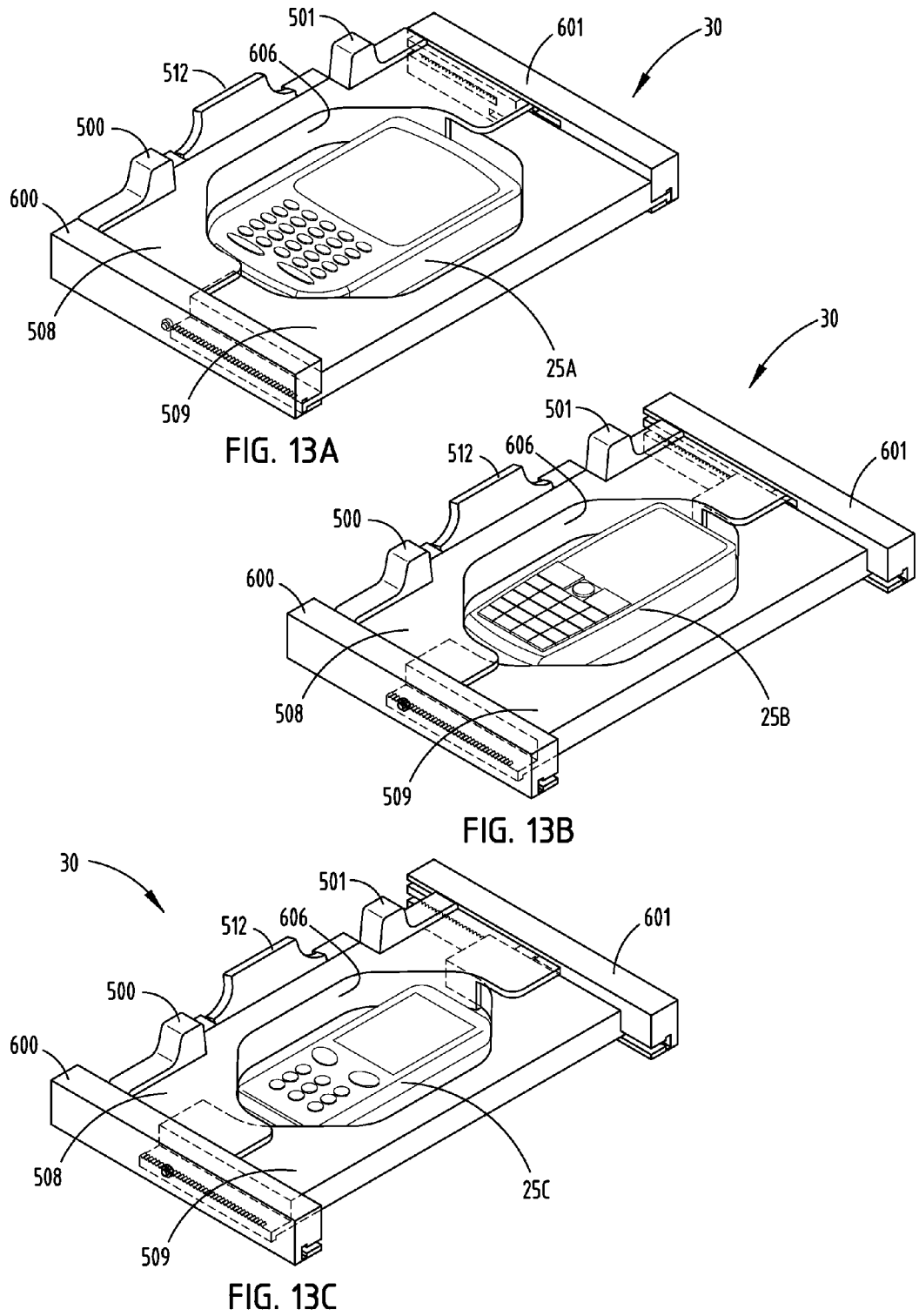
FIG. 13A is a perspective view of the charging apparatus 30 for engaging and maintaining alignment for a large size cell phone 25A.
FIG. 13B is a perspective view of the charging apparatus 30 for engaging and maintaining alignment for a medium size cell phone 25B.
FIG. 13C is a perspective view of the charging apparatus 30 for engaging and maintaining alignment for a small size cell phone 25C.

Perspective views of the charging apparatus 30 for engaging and maintaining alignment for different size cell phones are shown in FIGS. 13A-13C. FIGS. 12A and 13A depict a perspective view of the housing 30 for inductively charging a large size cell phone 25A. FIGS. 12B and 13B depict a perspective view of the housing 30 for inductively charging a medium size device 25B. FIGS. 12C and 13C depict a perspective view of the housing 30 for inductively charging a small size device 25C.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A system for wirelessly charging a chargeable device comprising:
   a charger comprising at least one transmitting coil in proximity to a charging surface; and
   an adjustable retaining assembly configured to substantially engage the chargeable device, the assembly having a first retaining member and a second retaining member coupled such that movement of the first retaining member results in a simultaneous movement of the second retaining member.

2. The system of claim 1, wherein the first retaining member has a first teeth pattern and the second retaining member has a second teeth pattern, further wherein a driving gear is positioned to engage both the first teeth pattern and the second teeth pattern.

3. The system of claim 1, wherein the adjustable retaining assembly further comprises:
   at least one adjustable mechanism comprising an adjustable pivot structure configured to allow a user to lock at least one pin within the retaining assembly engaged to at least one tooth or hole within the retaining assembly.

4. The system of claim 1, wherein the adjustable retaining member engages at least a portion of a perimeter of the chargeable device in a first position and disengages the chargeable device in a second position.

5. The system of claim 1, wherein said adjustable retaining assembly substantially simultaneously engages corners of the chargeable device.

6. The system of claim 5, wherein the adjustable retaining assembly engages four corners of a rectangular shaped device.

7. The system of claim 1, wherein said substantial engagement maintains a receiving coil of the chargeable device in a particular orientation on the charging surface.

8. The system of claim 1, wherein the system comprises a charging region provided in a tray within a vehicle.

9. An in-vehicle system for wirelessly charging a chargeable device, comprising:
   a charger comprising at least one transmitting coil in proximity to a charging surface in a vehicle; and
   an adjustable retaining assembly configured to engage corners of the chargeable device such that a plurality of gaps are defined around the chargeable device between the chargeable device and the retaining assembly which extend from corner to corner.

10. The in-vehicle system of claim 9, wherein the adjustable retaining assembly further comprises a first retaining member, a second retaining member and an adjustable mechanism configured to allow the first retaining member to move relative to the second retaining member.

11. The in-vehicle system of claim 10, wherein a movement of the first retaining member causes the second retaining member to move in synchronization.

12. The in-vehicle system of claim 10, wherein the adjustable retaining assembly further comprises:
   at least one adjustable mechanism comprising an adjustable pivot structure configured to allow a user to lock at least one pin within the retaining assembly engaged to at least one tooth or hole within the retaining assembly.

13. The in-vehicle system of claim 10, wherein the adjustable retaining member engages at least a portion of a perimeter of the chargeable device in a first position and disengages the chargeable device in a second position.

14. The in-vehicle system of claim 9, wherein said adjustable retaining assembly substantially simultaneously engages corners of the chargeable device.

15. The system of claim 14, wherein the adjustable retaining assembly engages four corners of a rectangular shaped device.

16. A retainer assembly comprising:
   first and second retaining members configured to substantially engage at least a portion of a perimeter of a chargeable device to position the chargeable device on a surface in proximity to at least one retaining member; and
   an adjustable mechanism configured to allow the first retaining member to move relative to the second retaining member to position the device, wherein the first and second retaining members are substantially symmetrical.

17. The retainer assembly of claim 16 further comprising a charger comprising at least one transmitting coil in proximity to a charging surface.

18. The system of claim 16, wherein the system comprises a charging region provided in a tray within a vehicle.

19. The system of claim 16, wherein the first and second retaining members are configured to only engage corners of the chargeable device.

* * * * *